US011110823B2

(12) United States Patent
Lee et al.

(10) Patent No.: US 11,110,823 B2
(45) Date of Patent: Sep. 7, 2021

(54) SEAT TRACK MECHANISM FOR VEHICLE

(71) Applicant: HYUNDAI TRANSYS INC., Seosan-si (KR)

(72) Inventors: Jae Sung Lee, Osan-si (KR); Hwa Young Mun, Hwaseong-si (KR); Jae Sang Lim, Osan-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 133 days.

(21) Appl. No.: 16/530,011

(22) Filed: Aug. 2, 2019

(65) Prior Publication Data
US 2020/0198501 A1 Jun. 25, 2020

(30) Foreign Application Priority Data
Dec. 20, 2018 (KR) .......... 10-2018-0165838

(51) Int. Cl.
*B60N 2/08* (2006.01)
*B60N 2/06* (2006.01)
*B60N 2/07* (2006.01)
*B60N 2/24* (2006.01)

(52) U.S. Cl.
CPC .............. *B60N 2/08* (2013.01); *B60N 2/067* (2013.01); *B60N 2/0725* (2013.01); *B60N 2/242* (2013.01)

(58) Field of Classification Search
CPC ........ B60N 2/08; B60N 2/067; B60N 2/0725; B60N 2/242; B60N 2/0727; B60N 2002/0212; B60N 2/04; B60N 2/06; B60N 2/07; B60N 2/0705; B60N 2/0712; B60N 2/0715; B60N 2/073; B60N 2/0806; B60N 2/0812; B60N 2/0818; B60N 2/0825; B60N 2/0831; B60N 2/0837; B60N 2/0862; B60N 2/0881; B60N 2/1685
USPC ....................................... 248/429
See application file for complete search history.

(56) References Cited

U.S. PATENT DOCUMENTS

| 5,087,009 | A | * | 2/1992 | Borlinghaus | B60N 2/02 248/429 |
| 6,254,188 | B1 | * | 7/2001 | Downey | B60N 2/123 248/430 |
| 7,607,835 | B2 | * | 10/2009 | Keller | F16C 29/008 384/40 |
| 9,403,448 | B1 | * | 8/2016 | Evans | B60N 2/245 |
| 9,511,685 | B2 | * | 12/2016 | Enokijima | B60N 2/0705 |
| 2006/0131470 | A1 | * | 6/2006 | Yamada | B60N 2/0705 248/424 |
| 2007/0090260 | A1 | * | 4/2007 | Kojima | B60N 2/0818 248/424 |

(Continued)

FOREIGN PATENT DOCUMENTS

KR     1020100030415 A     3/2010

*Primary Examiner* — Jonathan Liu
*Assistant Examiner* — Thomas J. Bridges

(57) ABSTRACT

A seat track mechanism for installing beneath a vehicle seat in order to move the vehicle seat in the forward and backward directions includes a monotrack mechanism, to which a monopost structure and a single rail structure are applied. The seat track mechanism includes a structure for hook-engaging lower and upper rails constituting the mono track mechanism by hook guides. The single rail structure applied to the seat track mechanism is capable of not only reducing actuating force required for operation, but also preventing creation of excessive clearance upon stopping.

16 Claims, 9 Drawing Sheets

(56) References Cited

U.S. PATENT DOCUMENTS

| | | | |
|---|---|---|---|
| 2012/0294674 A1* | 11/2012 | Lee ................. | B60N 2/0705 |
| | | | 403/322.4 |
| 2015/0321583 A1* | 11/2015 | Sasaki ............... | B60N 2/0727 |
| | | | 297/341 |
| 2017/0240067 A1* | 8/2017 | Stutika .............. | B60N 2/0818 |
| 2019/0070981 A1* | 3/2019 | Jakubowicz ....... | B60N 2/929 |
| 2020/0276919 A1* | 9/2020 | Kumagai ........... | B60N 2/0881 |

* cited by examiner

[FIG. 5]
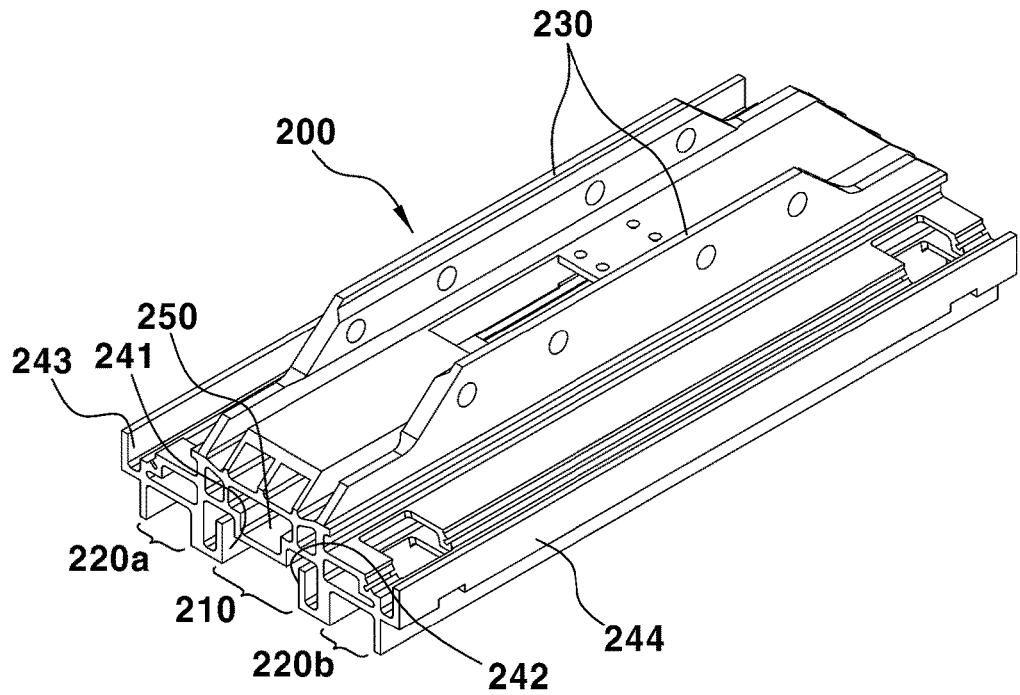
[FIG. 6]
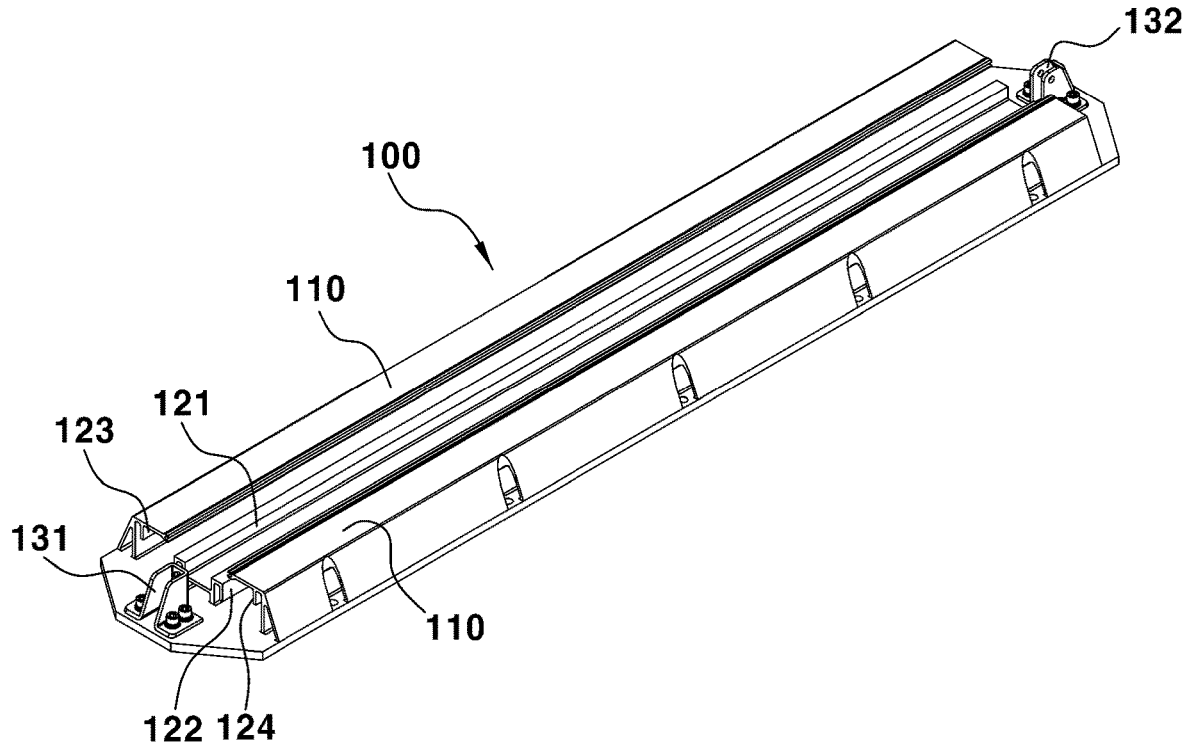

[FIG. 7]
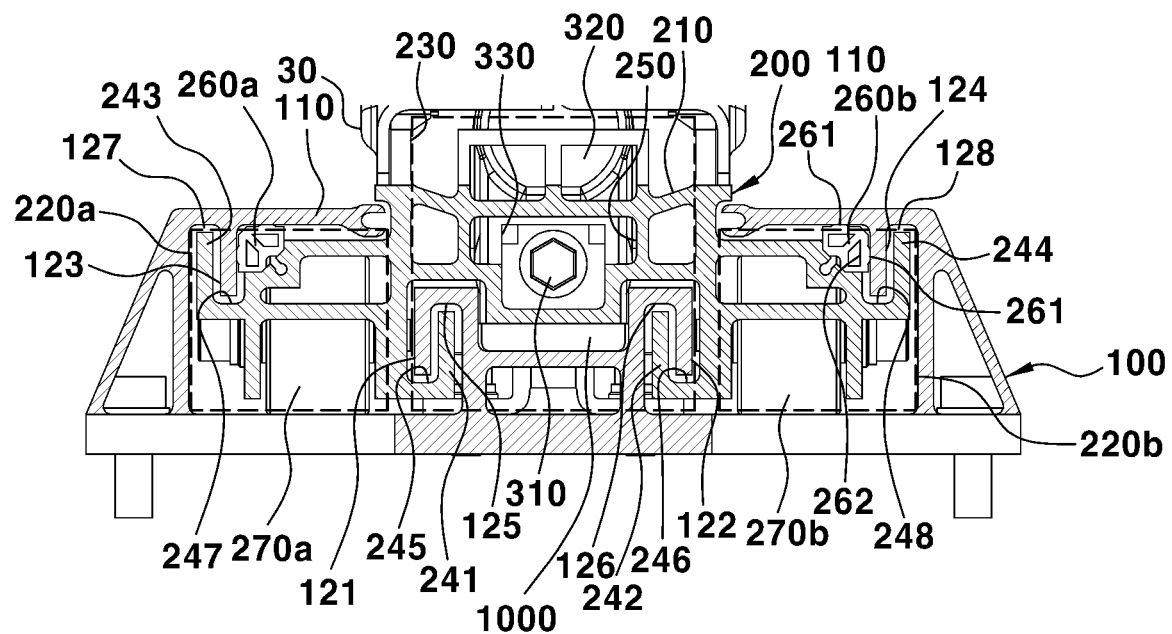

[FIG. 8]
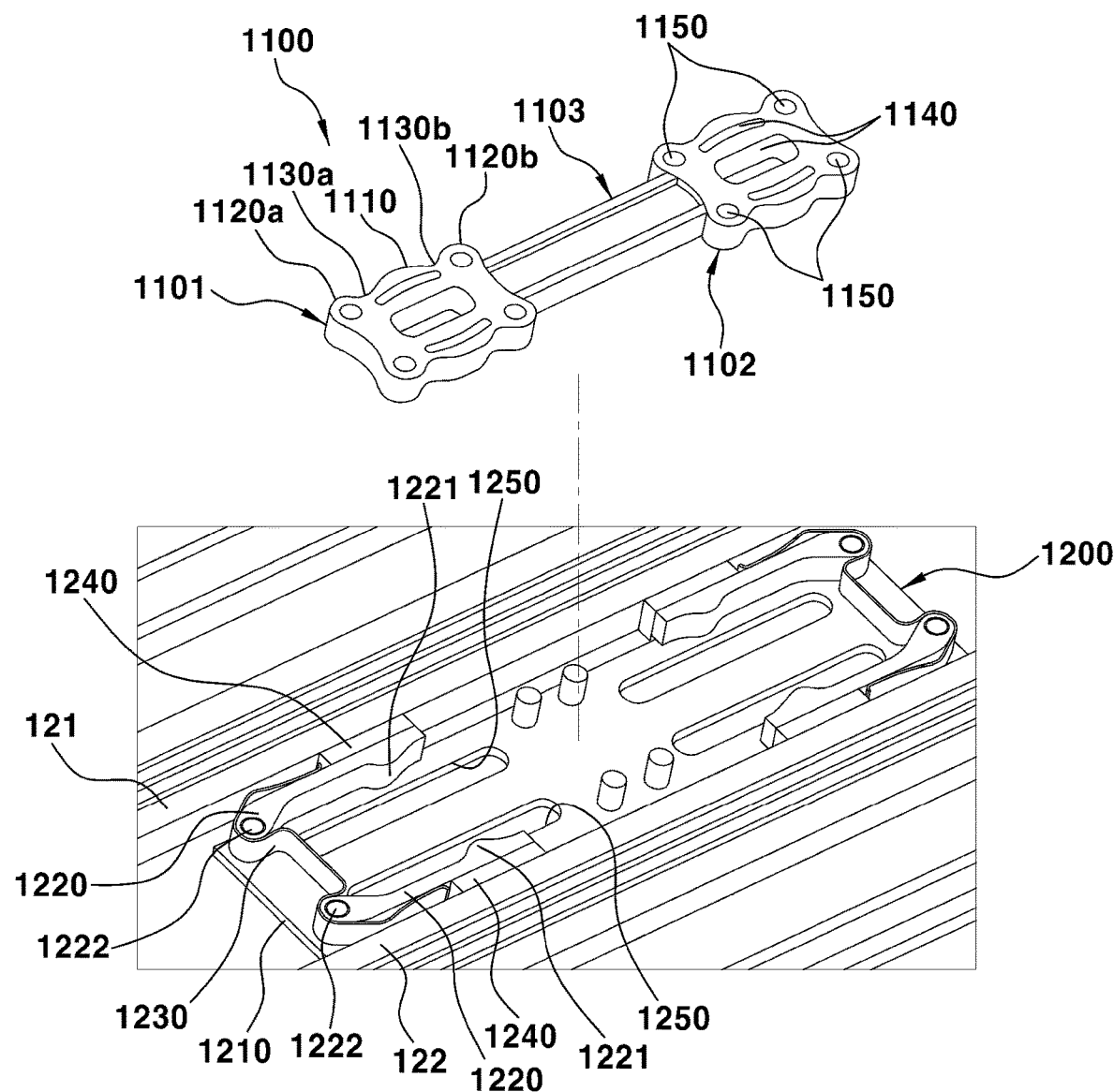

[FIG. 9]
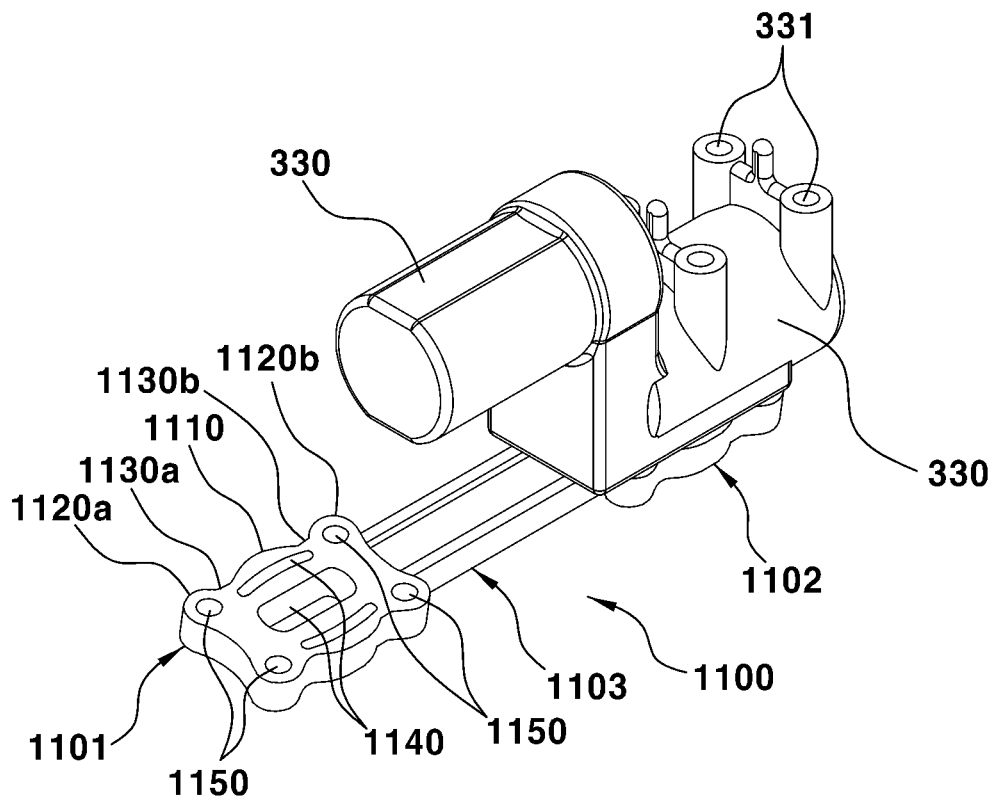
[FIG. 10a]
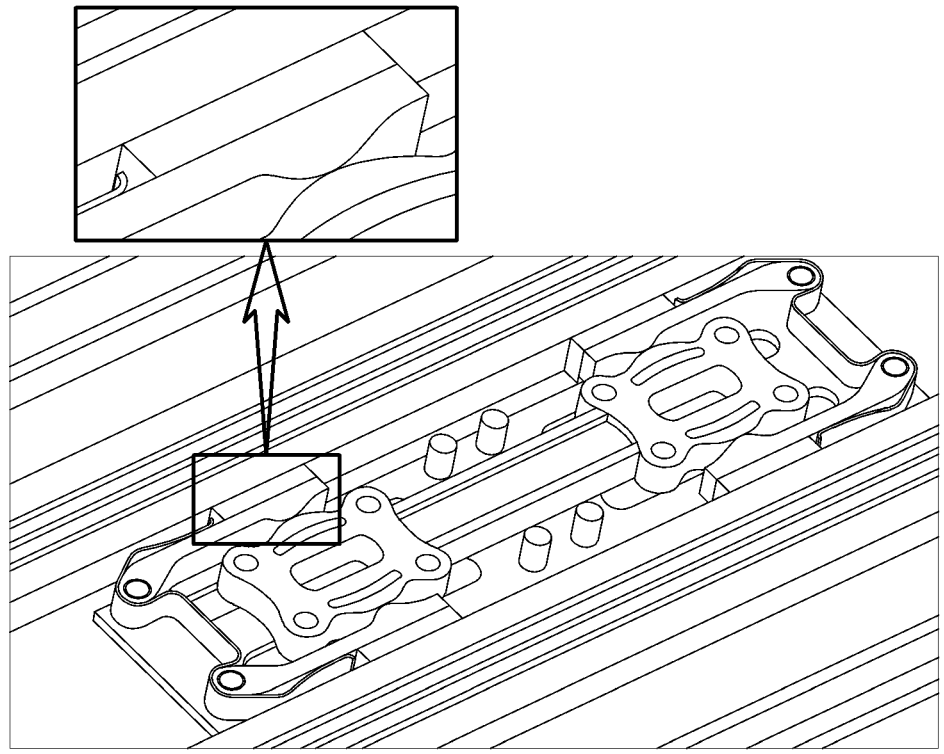

[FIG. 10b]
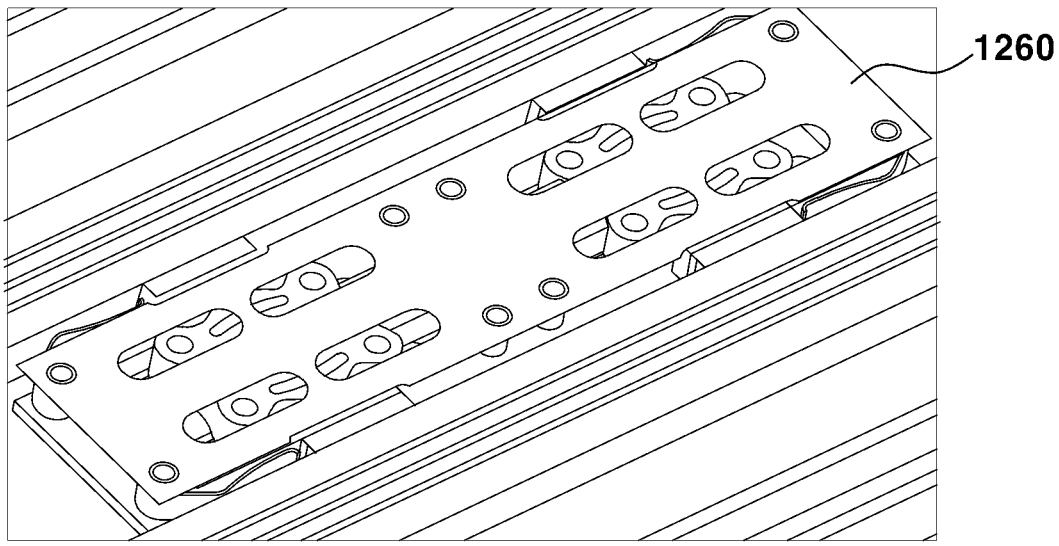
[FIG. 11a]
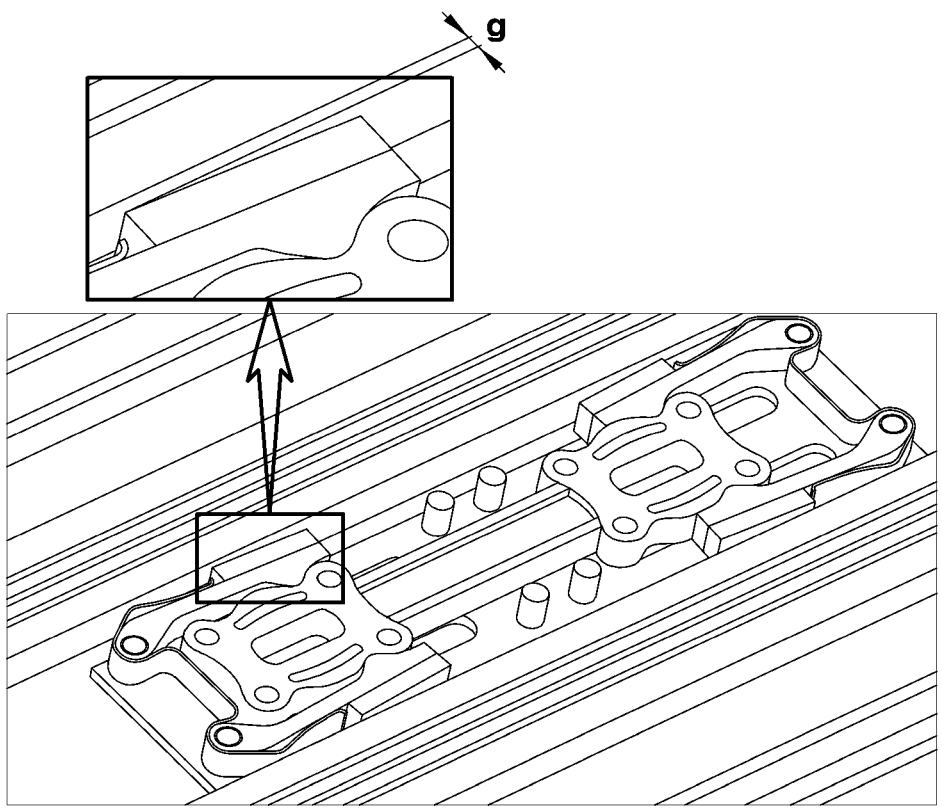

[FIG. 11b]
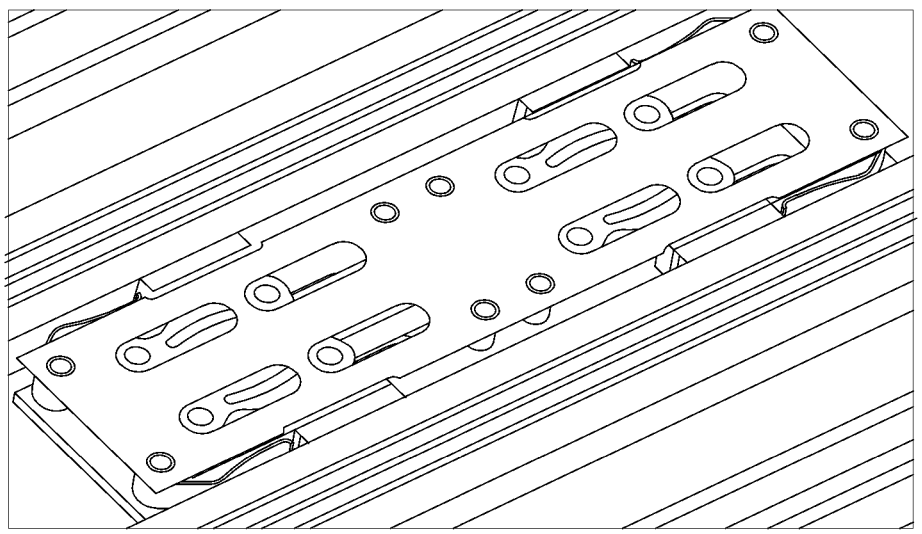

SEAT TRACK MECHANISM FOR VEHICLE

CROSS-REFERENCE TO RELATED APPLICATION

This application claims the benefit of priority under 35 U.S.C. § 119(a) to Korean Patent Application No. 10-2018-0165838 filed on Dec. 20, 2018, the entire contents of which are incorporated herein by reference.

BACKGROUND

(a) Technical Field

The present disclosure relates generally to a seat track mechanism for a vehicle, and more particularly to a seat track mechanism installed beneath a vehicle seat in order to facilitate movement of the vehicle seat in the forward and backward directions.

(b) Background

Various components are provided as part of seat of a vehicle in order to provide enhanced ride comfort and convenience to a driver or passenger. One such component is a seat track mechanism configured to facilitate movement of a seat forward and rearward on the basis of the body form of a driver or passenger sitting thereon. Such a seat track mechanism includes a pair of rails installed beneath a seat at opposite sides of the seat so that the seat can move forward and rearward along the rails.

Such a seat track mechanism includes a lower rail installed at the bottom of a vehicle, and an upper rail adapted to move forward and rearward along the lower rail. In particular, a seat is mounted on the upper rail. As actuating force to move the seat and the upper rail is applied, the seat is moved forward or rearward. In addition, the seat track mechanism includes a locking device for locking the seat at a specific position after movement of the seat to the specific position.

The above information disclosed in this background section is only for enhancement of understanding of the background of the disclosure and therefore it may contain information that does not form the prior art that is already known in this country to a person of ordinary skill in the art.

SUMMARY OF THE DISCLOSURE

Embodiments of the present disclosure have been made in an effort to solve the above-described problems associated with the prior art.

Aspects of present disclosure relate to a seat track mechanism for a vehicle in which the track structure thereof mounted to the bottom of a seat employs a single rail structure, rather than a double rail structure, thereby not only achieving slimness and autonomy associated with design of the seat bottom, but also simplifying the overall structure through a reduction in the number of constituent elements.

The single rail structure includes a single center rail and, as such, is disadvantageous in terms of lateral clearance, as compared to the double rail structure including rails installed at opposite lateral ends of the seat bottom. To this end, an additional clearance eliminating structure is needed. However, when such a clearance eliminating structure is applied, there may be a problem in that the actuating force for seat sliding should increase.

Therefore, the present disclosure also relates to a single rail structure applied to a seat track mechanism for a vehicle that solves the above-described problems while being capable of not only reducing actuating force required for movement of a seat, but also preventing creation of excessive clearance in a stopped state of the seat.

According to an aspect of the present disclosure, a seat track mechanism for a vehicle includes a lower rail fixed to a body of the vehicle, an upper rail that is mounted to a seat of the vehicle and is movable forward and rearward along the lower rail, a driver for providing an actuating force to move the upper rail forward and rearward along the lower rail, and a locking mechanism mounted to the upper rail and adapted to control a rail gap between the locking mechanism and the lower rail, thereby restraining movement of the upper rail. The locking mechanism may reduce the rail gap when the vehicle seat is in a stopped state to restrain the movement of the upper rail, and increase the rail gap when the vehicle seat is moved by the driver, to release movement restraint of the upper rail.

According to an aspect of the present disclosure, the locking mechanism may include a center case fixedly mounted on the upper rail, and a center plate received in the center case in such a manner that the center plate moves alone or together with the center case.

According to an aspect of the present disclosure, the center plate may be mounted to the driver.

According to an aspect of the present disclosure, the driver may include a lead screw rotatably mounted to the lower rail, a motor for rotating the lead screw, and a nut member mounted to the upper rail and formed with female threads having a shape corresponding to a screw shape of the lead screw, the nut member moving forward and rearward in accordance with rotation of the lead screw.

According to an aspect of the present disclosure, the center plate may include a pressing head having two actuating surfaces each formed with a pressing protrusion and receiving grooves, and the center case may include a pair of fingers for pressing the lower rail while operating together with the pressing head.

According to an aspect of the present disclosure, each of the actuating surfaces in the pressing head may include a W-shaped actuating surface formed with a pair of receiving grooves at opposite sides of the pressing protrusion and formed with stopper protrusions at opposite ends thereof.

According to an aspect of the present disclosure, at least one cavity may be formed within the pressing head.

According to an aspect of the present disclosure, the center case may include a lower case supporting the center plate, and an upper case assembled to the lower case and mounted to a lower portion of the upper rail, and the fingers may be hinged to the lower case.

According to an aspect of the present disclosure, the fingers may be formed with finger protrusions protruding toward the pressing head, respectively, and the actuating force of the driver may be transmitted to the center case via the finger protrusions contacting the pressing head.

According to an aspect of the present disclosure, the fingers may press the lower rail while being widened as the pressing head moves while contacting the finger protrusions.

According to an aspect of the present disclosure, each of the fingers may have a pressing surface formed at an opposite side of the finger protrusion of the finger, and a pressing pad may be disposed between the pressing surface of the finger and the lower rail.

According to an aspect of the present disclosure, the pressing pad may be installed on the center case in such a manner that a predetermined gap is maintained between the pressing pad and the lower rail when the pressing pad is not pressed by the finger, and the gap between the pressing pad and the lower rail may become zero when the pressing pad is pressed by the finger.

According to an aspect of the present disclosure, a pair of elastic members may be installed at the center case, to provide a restoring force for narrowing the fingers inwards.

According to an aspect of the present disclosure, the elastic members are plate springs for applying an inward force to the fingers, respectively.

According to an aspect of the present disclosure, the lower rail may include a pair of hook guides provided at a central lower portion of the lower rail, and the locking mechanism may be disposed between the hook guides, and controls the rail gap as the fingers press the hook guides disposed adjacent thereto, respectively.

According to an aspect of the present disclosure, the center plate may have a symmetrical structure including the pressing head, a rod connected to the pressing head and another pressing head connected to the rod, and the center case may further include another pair of fingers connecting the other pressing head.

Other aspects and embodiments of the present disclosure are discussed infra.

It is understood that the terms "vehicle," "vehicular" and other similar terms as used herein are inclusive of motor vehicles in general such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus do not limit the scope of the present disclosure, and wherein:

FIG. 5 is a perspective view illustrating an upper rail of the seat track mechanism according to an exemplary embodiment;

FIG. 6 is a perspective view illustrating a lower rail of the seat track mechanism according to an exemplary embodiment;

FIG. 7 is a cross-sectional view of the seat track mechanism according to the exemplary embodiment taken along line B-B' in FIG. 2;

FIG. 8 is a perspective view illustrating a center plate and a center case in a locking mechanism according to an exemplary embodiment;

FIG. 9 is a perspective view illustrating the center plate of the locking mechanism according to an exemplary embodiment and a nut member fastened to the center plate;

FIGS. 10A and 10B are perspective views illustrating operation states of the locking mechanism mounted to a lower portion of the upper rail in the seat track mechanism according to an exemplary embodiment, respectively; and FIGS. 11A and 11B are perspective views illustrating operation states of the locking mechanism mounted to a lower portion of the upper rail in the seat track mechanism according to an exemplary embodiment, respectively.

Figure 1:
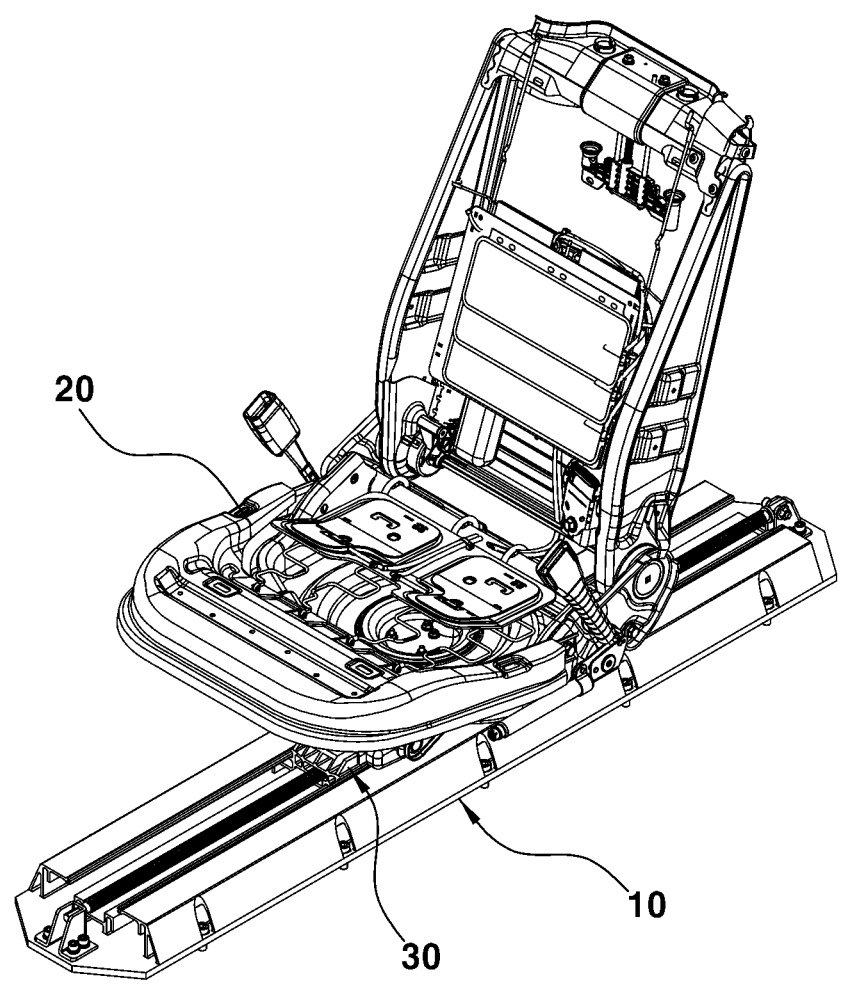
FIG. 1 is a perspective view illustrating a seat for a vehicle to which a seat track mechanism according to an exemplary embodiment is mounted.

It should be understood that the appended drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will be made in detail to various embodiments of the present disclosure, examples of which are illustrated in the accompanying drawings and described below. While the present disclosure will be described in conjunction with exemplary embodiments, it will be understood that the present description is not intended to limit the scope of the disclosure to the exemplary embodiments. On the contrary, the present disclosure is intended to cover not only the exemplary embodiments, but also various alternatives, modifications, equivalents, and other embodiments, which may be within the spirit and scope of the present disclosure as defined by the appended claims.

The present disclosure relates to a seat track mechanism for a vehicle, and more particularly to a seat track mechanism for a vehicle in which a monopost and a monotrack are applied to the bottom of a seat in order to achieve slimness in design of the seat bottom and to secure freedom of movement of the seat. In particular, in the present disclosure, a monopost structure is applied in order to achieve various seat operations required in an autonomous vehicle, and a rail structure for sliding the monopost structure forward and rearward is installed beneath the monopost structure. Hereinafter, a seat track mechanism for a vehicle according to an exemplary embodiment will be described with reference to the annexed drawings.

Figure 2:
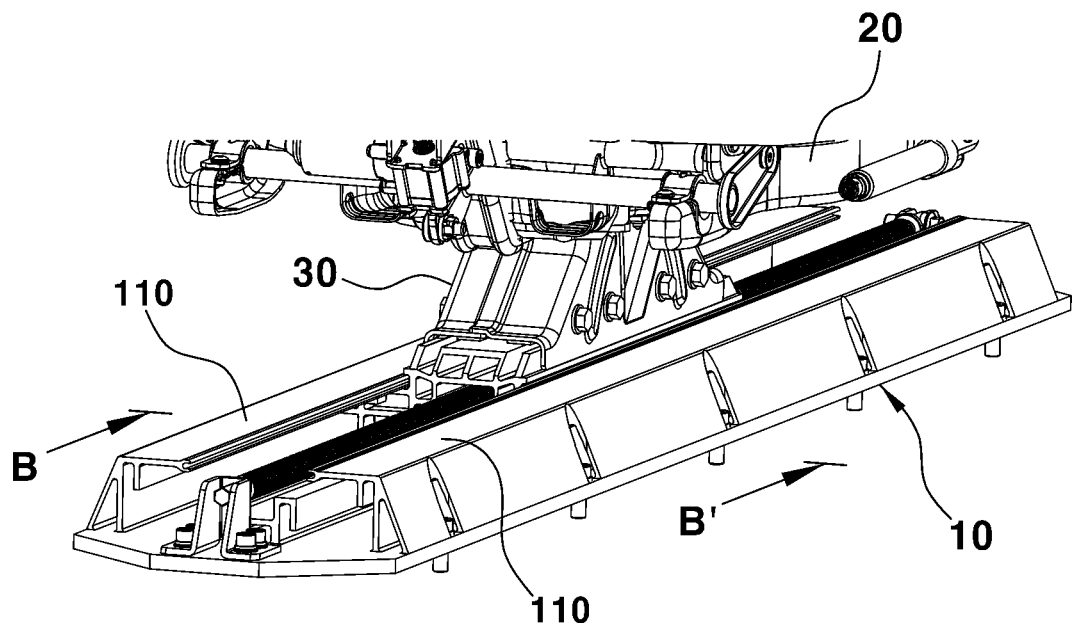
FIG. 2 is a perspective view illustrating a monotrack structure mounted to the bottom of a seat included in the seat track mechanism according to an exemplary embodiment.

FIG. 1 illustrates a seat for a vehicle to which a seat track mechanism according to an exemplary embodiment of the present disclosure is mounted. FIG. 2 is a monotrack structure mounted to the bottom of a seat included in the seat track mechanism according to the exemplary embodiment.

As illustrated in FIG. 1, in association with the vehicle seat track mechanism according to an exemplary embodiment of the present disclosure, a monopost 30 for fixing and mounting a seat 20 is installed on a lower portion of the seat 20. In detail, the monopost 30 is installed on a seat rail in such a manner that the monopost 30 is slidable forward and rearward.

Figure 4:
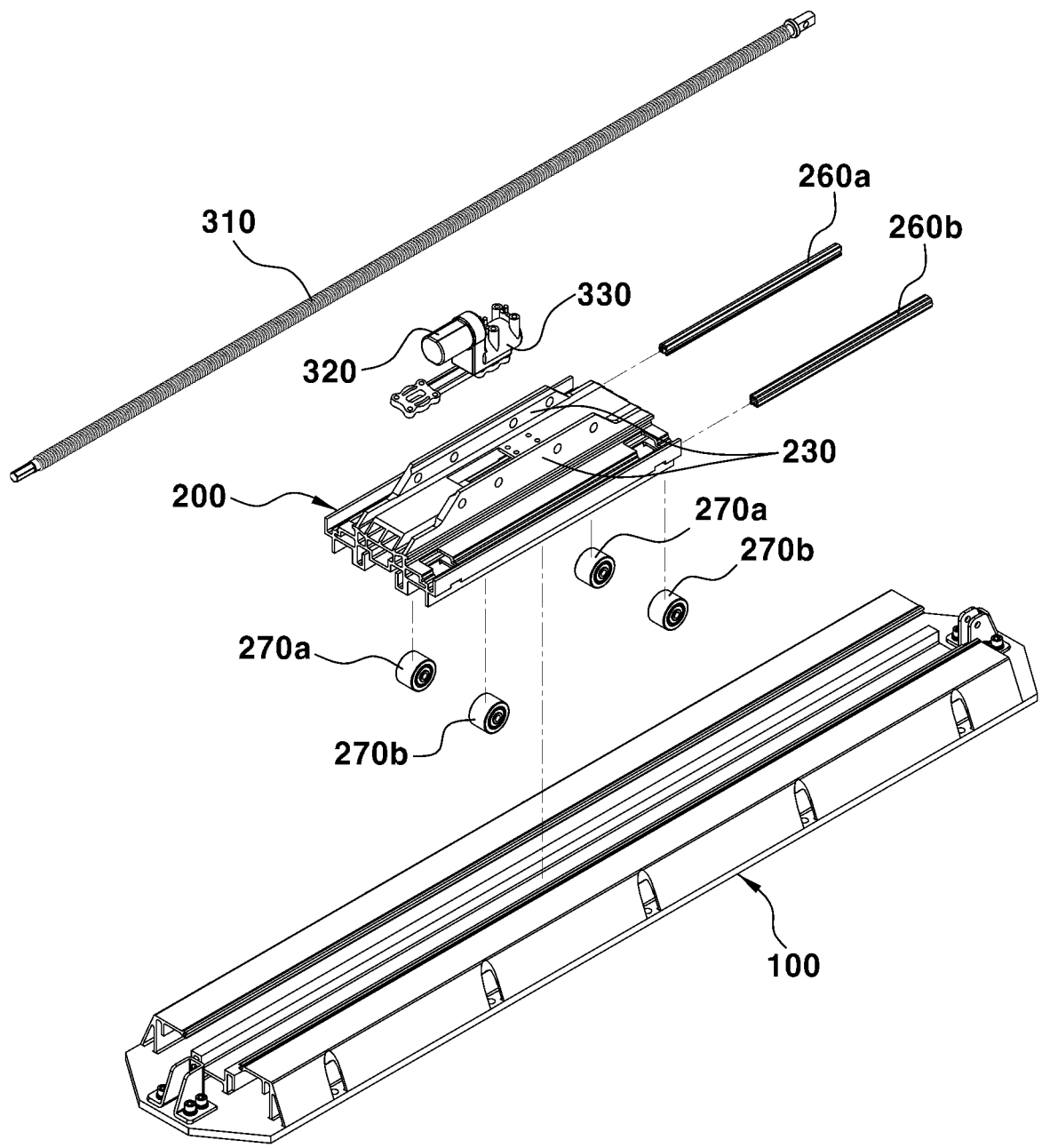
FIG. 4 is an exploded perspective view illustrating the detailed configuration of the seat track mechanism shown in FIG. 3.

In particular, as illustrated in FIG. 2, the monopost 30 installed on the lower portion of the vehicle seat may be a structure having a single post shape. The monopost 30 is mounted on an upper rail 200. The upper rail 200, on which the monopost 30 is mounted, is coupled to a lower rail 100 in such a manner that the upper rail 200 is slidable on the lower rail 100. According to an embodiment, the upper rail 200 receives sliding operation force from a driver including a motor 320 as shown in FIG. 4. Accordingly, the seat mounted on the upper rail 200 can move forward and rearward along the lower rail 100 fixed to a vehicle body by means of the upper rail 200 and the monopost 30.

Thus, the vehicle seat track mechanism according to an exemplary embodiment of the present disclosure is a seat track mechanism 10 suitable for the monopost structure installed on the lower portion of the seat, and the monotrack mechanism includes the upper rail 200 connected to the monopost 30 and the lower rail 100 configured to allow sliding of the upper rail 200 thereon.

In detail, in the present disclosure, seat rails including the upper rail 200 and lower rail 100, and the driver including a lead screw 310 as well as the motor 320 to enable sliding of the upper rail 200 are collectively referred to as the "seat track mechanism 10." In regard with this, the seat track mechanism 10 in the present disclosure includes the entirety of the mechanism coupled to the monopost 30 mounted on the lower portion of the seat in order to move the seat. Configurations disposed beneath the monopost 30 in FIG. 2 may be referred to as the "seat track mechanism 10."

Meanwhile, although an exemplary embodiment proposes an example in which the seat track mechanism includes the motor-driven driver operating by the motor 320, according to embodiments of the present disclosure a manually-driven driver other than the motor-driven driver may be used. That is, the seat track mechanism may have a configuration in which the driver or passenger slides the seat by directly applying operating force to the seat, and locks the seat at a desired position by a locking device included in the seat track mechanism. In addition, although in addition to the motor-driven driver including the motor 320 and the lead screw 310 depicted in FIG. 4, according to embodiments drivers of other types may be used, so long as they are applicable to the monotrack structure capable of achieving sliding of the upper rail 200.

Figure 3:
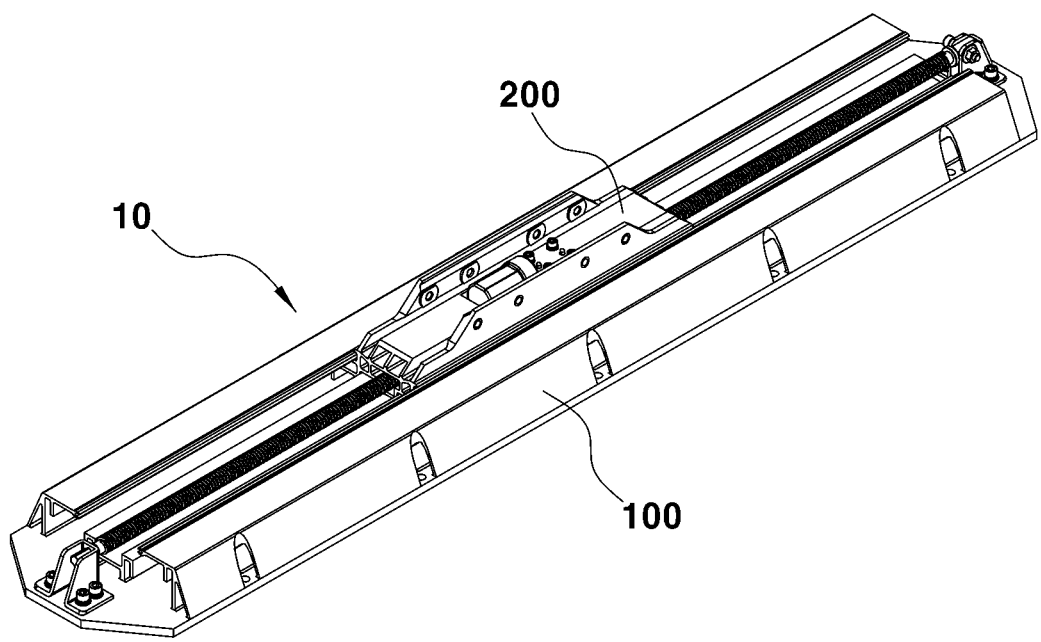
FIG. 3 is a perspective view illustrating the seat track mechanism according to an exemplary embodiment.

FIG. 3 illustrates a detailed configuration of the above-described seat track mechanism 10. FIG. 4 illustrates an exploded state of the detailed configuration of the seat track mechanism 10 shown in FIG. 3.

Referring to FIGS. 3 and 4, the vehicle seat track mechanism according to the illustrated embodiment has a configuration including the lower rail 100 mounted to the vehicle body at a lower portion of the vehicle, and the upper rail 200 coupled to the lower rail 100 in such a manner that the upper rail 200 may move forward and rearward along the lower rail 100. In particular, the upper rail 200 in the illustrated embodiment is a configuration for mounting and supporting the monopost 30. That is, the upper rail 200 is configured to slide forward and rearward while substantially supporting the seat to which the monopost 30 is mounted. To this end, a mounting bracket 230 may be formed at an upper end of the upper rail 200, for mounting of the monopost 30. The monopost 30 may be fixed to the mounting bracket 230. Although FIG. 4 illustrates an example in which a pair of mounting brackets 230 is formed at the upper end of the upper rail 200, the number and shape of the mounting brackets 230 may be varied and the scope of the disclosure is not limited in this regard. Any number and shape of the mounting brackets 230 may be applied without limitation, so long as the mounting brackets 230 allow mounting and fixing of the monopost 30 thereto beneath the seat without interfering with movement of the upper rail 200. The upper rail 200 and lower rail 100 may be made of a metal material, for example, aluminum.

In addition, the upper rail 200 of the vehicle seat track mechanism according to embodiments the present disclosure is slidable along the lower rail 100. In the illustrated embodiment, the upper rail 200 is configured to move forward and rearward while sliding by the driver. In detail, as illustrated in FIGS. 3 and 4, the vehicle seat track mechanism according to the illustrated embodiment includes the lead screw 310 and the motor 320. The lead screw 310 extends in a longitudinal direction of the lower rail 100 and is fixed to opposite longitudinal ends of the lower rail 100. The motor 320 rotates the lead screw 310. Although not shown in detail, the motor 320 includes a rotational shaft connectable to a gearing for transmitting rotational force to the lead screw 310. Alternatively, the rotational shaft of the motor 320 may be directly connected to the lead screw 310.

In addition, a nut member 330 formed with female threads having a shape corresponding to a screw shape of the lead screw 310 is coupled to the lead screw 310. The nut member 330 is mounted on the upper rail 200. Accordingly, as the lead screw 310 rotates, the nut member 330 mounted on the upper rail 200 moves forward or rearward. When the motor 320 is driven, the upper rail 200 moves forward or rearward along the lead screw 310, together with the nut member 330.

In this case, the nut member 330 may have a structure in which the female threads corresponding to the shape of the lead screw 310 are formed at an inner portion of the nut member 330, and a plurality of bolt holes is formed at an outer portion of the nut member 330, for mounting of the nut member 330 to the upper rail 200. As shown in FIG. 4, four bolt holes are formed at an upper portion of the nut member 330. When bolting is achieved at the four bolt holes, the nut member 330 is firmly fastened to the upper rail 200. Accordingly, as the lead screw 310 rotates during driving of the motor 320, the nut member 330 and the upper rail 200, which are coupled to the lead screw 310, move forward or rearward.

To this end, as illustrated in FIG. 5, the upper rail 200 is provided with a fastening section, to which the nut member 330 is fastened, and a through hole 250, through which the lead screw 310 extends.

In particular, in an exemplary embodiment of the present disclosure, the upper rail 200 includes a body 210, to which the nut member 330 is mounted and fastened, and a through hole 250, through which the lead screw 310 extends, is formed in the body 210. In addition, a pair of wings 220a and 220b is formed at the body 210, to extend longitudinally from opposite lateral ends of the body 210. Hook guides 241, 242, 243, and 244 are also provided on the body 210 and the wings 220a and 220b.

In particular, the lower rail 100 is configured to have a structure enclosing at least a portion of each of the wings 220a and 220b in the upper rail 200, to enable the seat track structures connected by the monopost 30 to provide sufficient structural stability. That is, as illustrated in FIGS. 2 and 7, etc., the wings 220a and 220b of the upper rail 200 are configured to be sufficiently enclosed by opposite covers 110 of the lower rail 100. Hook engagement is achieved inside the covers 110 by means of hook guides 241, 242, 243, and 244 of the upper rail 200 and lower rail 100. The configuration of the hook guides and the hook engagement by the hook guides will be described later.

According to an embodiment, the lead screw 310 is inserted into the upper rail 200 through the through hole 250 under the condition that the nut member 330 is coupled to the lead screw 310. In this state, the lead screw 310 is rotatably mounted to front and rear mounting brackets 131 and 132 of the lower rail 100.

In addition, to assist forward and rearward movement of the upper rail 200, a plurality of rollers 270a and 270b may be mounted on a lower portion of the upper rail 200. The rollers 270a and 270b may be rotatably mounted to the upper rail 200, to allow forward and rearward movement of the upper rail 200 while being in linear contact with the lower rail 100 at bottom surfaces thereof. The rollers 270a and 270b may include one or more left rollers (designated by reference numeral "270a") arranged at the left side of the upper rail 200 and one or more right rollers (designated by reference numeral "270b") arranged at the right side of the upper rail 200. According to an embodiment, two left rollers and two right rollers may be installed, as illustrated in FIG. 4.

That is, the seat track mechanism according to the illustrated embodiment has configurations in which the upper rail 200 is moved forward and rearward upon the rollers as well by driver including the motor 320 and the lead screw 310, and the lower rail 100 disposed beneath the upper rail 200 guides movement of the upper rail 200 while achieving mounting of the lead screw 310 thereto.

In addition, the vehicle seat track mechanism according to the illustrated embodiment of the present disclosure is configured to be connected to a single post, that is, the monopost 30, as a post for connecting the seat track mechanism to the seat. In connection with this, the seat track mechanism is configured to solve issues associated with movement of the seat transferred to the upper rail 200 via the monopost 30 and concentration of load caused by movement of the seat. In particular, the vehicle seat track mechanism according to the illustrated embodiment includes the upper rail 200 and the lower rail 100 which are configured to be hook-engaged by rail guides extending vertically at least four places arranged in a width direction of the seat track mechanism, in order to obtain improved strength upon lateral damage to the vehicle seat or head-on or rear-end collision.

In connection with this, FIGS. 5 and 6 illustrate the upper rail 200 and the lower rail 100 of the seat track mechanism according to an exemplary embodiment of the present disclosure, respectively. FIG. 7 shows a cross-section of the seat track mechanism taken along line B-B' in FIG. 2.

As illustrated in FIG. 7, in the seat track mechanism according to an exemplary embodiment of the present disclosure, hook type rail guides formed at the upper rail 200 and the lower rail 100 hook-engage with one another while extending in a sliding direction of the upper rail 200 and alternating with one another.

In detail, as illustrated in FIG. 7, the lower rail 100 includes four hook guides 121, 122, 123, and 124 formed to extend in a longitudinal direction of the lower rail 100. The hook guides 121, 122, 123, and 124 hook-engage with hook guides 241, 242, 243, and 244 of the upper rail 200. The hook guides 121, 122, 123, 124, 241, 242, 243, and 244 extend from the corresponding upper rail 200 or lower rail 100 in a bent state while forming guide grooves 125, 126, 127, 128, 245, 246, 247, and 248, respectively, and restrain one another in such a manner that one hook guide is fitted in the guide groove formed by another hook guide.

As illustrated in the cross-sectional view of FIG. 7, each hook guide may extend in the longitudinal direction of the corresponding seat rail while having an L-shaped cross-section open at one side thereof. Each hook guide may be configured to have one end mounted to the corresponding seat rail, that is, the lower rail 100 or the upper rail 200, and the other end functioning as an engagement end to engage with a portion of another hook guide engaging with the former hook guide. That is, one end of each hook guide in the illustrated embodiment of the present disclosure is mounted to the upper rail 200 or lower rail 100, to be integrated with the upper rail 200 or lower rail 100, and the other end of the hook guide extends from one end of the hook guide while being bent from one end of the hook guide, to form a hook-shaped cross-section. In the present disclosure, the other end of the hook guide is referred to as an "engagement end," for convenience.

In the present disclosure, accordingly, hook engagement of the hook guides means that each hook guide of the lower rail (or the upper rail) is fitted in the guide groove of the hook guide of the upper rail (or the lower rail) adjacent to the former hook guide of the lower rail (or the upper rail) and, as such, the former and latter hook guides engage with each other in a state allowing sliding movement of the upper rail while restraining relative movement therebetween in other directions by the engagement ends thereof. Of course, in this case, the engagement end of the hook guide of the upper rail (or the lower rail) may also be fitted in the guide groove of the hook guide of the lower rail (or the upper rail) adjacent to the hook guide of the upper rail (or the lower rail). Accordingly, since the upper rail 200 and the lower rail 100 engage with each other by means of the hook guides, as shown in FIG. 7, the upper rail 200 and the lower rail 100 may restrain each other when relative movement therebetween in longitudinal and lateral directions is generated.

In addition, in accordance with the illustrated embodiment of the present disclosure, each of the upper rail 200 and lower rail 100 may be configured to include four hook guides, as illustrated in FIG. 7. In this embodiment, as hook engagement is achieved at least four places of the seat rail, it may be possible to effectively avoid separation of the lower rail 100 upon head-on or rear-end collision. That is, as illustrated in FIGS. 6 and 7, a first lower hook guide designated by reference numeral "121" and a second lower hook guide designated by reference numeral "122" are symmetrically formed at a central portion of the lower rail 100, and a third lower hook guide designated by reference numeral "123" and a fourth lower hook guide designated by reference numeral "124" are symmetrically formed at opposite sides of the central portion of the lower rail 100 outside the first and second lower hook guides 121 and 122, respectively.

Similarly, as illustrated in FIGS. 6 and 7, first to fourth upper hook guides designated by reference numerals "241," "242," "243," and "244" are formed on the upper rail 200 at positions corresponding to the first to fourth lower hook guides 121, 122, 123, and 124, to engage with the first to fourth lower hook guides 121, 122, 123, and 124, respectively.

In this case, the first and second upper hook guides 241 and 242 are formed at a lower surface of the body, namely, a central body 210, of the upper rail 200 connected to the monopost 30, and the third and fourth upper hook guides 243 and 244 are formed at the wings 220a and 220b extending from opposite sides of the central body 210, respectively. According to an embodiment, the rollers 270*a* and 270*b* are installed in plural at the wings 220*a* and 220*b* of the upper rail 200, respectively, to be arranged in a longitudinal direction of the upper rail 200. According to an embodiment, the third and fourth upper hook guides 243 and 244 are formed outside the rollers 270*a* and 270*b* with reference to the center of the upper rail 200, respectively. According to an embodiment, left rollers 270*a* are mounted on the upper rail 200. For example the left rollers 270*a* may be mounted on the wing 220*a* of the upper rail 200, between the first upper hook guide 241, and the third upper hook guide 243. According to an embodiment, right rollers 270*b* are mounted on the upper rail 200. For example, the right rollers 270*b* may be mounted on the wing 220*b* of the upper rail 200, between the second upper hook guide 242, and the fourth upper hook guide 244.

In this case, the hook guides are arranged in pairs at opposite sides of the left and right rollers 270*a* and 270*b* with reference to the bottom surfaces of the left and right rollers 270*a* and 270*b* as contact surfaces between the upper rail 200 and the lower rail 100. Accordingly, it may be possible to effectively cope with longitudinal and lateral impact. Although the illustrated embodiment illustrates an example in which respective pairs of rollers 270*a* and 270*b* are installed at opposite sides, namely, left and right sides, as shown in FIG. 4, the number of rollers may be varied. For example, 4, 6, or 8 rollers may be arranged at the lower portion of the upper rail 200. On the other hand, in accordance with an embodiment, only two rollers may be arranged at a central portion of the body 210 while being longitudinally aligned. In this case, the rollers may have a sufficient width to provide a sufficient contact area with respect to the lower rail 100.

In addition, as illustrated in FIG. 7, the engagement ends of the hook guides in the upper rail 200 and the engagement ends of the hook guides in the lower rail 100 should be oriented in opposite directions. Here, the orientation direction of each engagement end means the direction in which the associated hook guide extends from the upper rail 200 or the lower rail 100 when viewed in cross-section. Accordingly, the hook guides of the upper rail 200 may extend upward, and the hook guides of the lower rail 100 may extend downward, as shown in FIG. 7. Although FIG. 7 illustrates an example in which corresponding ones of the hook guides extend vertically in opposite directions, the extension directions of the hook guides are not limited to the vertical directions as shown in FIG. 7. For example, the hook guides may be formed to have certain inclination with respect to the vertical directions.

Meanwhile, the engagement height of the first and second lower hook guides 121 and 122 as central lower hook guides may differ from the engagement height of the third and fourth lower hook guides 123 and 124 as outer lower hook guides, in view of strength reinforcement. Here, the "engagement height" is defined by an arithmetic average value of the bottom height in each of the guide grooves 125, 126, 127, and 128 and the height of the corresponding engagement end. That is, points, at which the upper rail 200 is restrained by the lower rail 100 upon head-on or rear-end collision in an engaged state of the hook guides according to the present disclosure, are the bottom position of each guide groove and the tip position of the corresponding engagement end when viewed in cross-section. In the present disclosure, accordingly, the arithmetic average value of the heights of the two positions providing substantial restraint is referred to as an "engagement height."

For example, as illustrated in FIG. 7, the engagement heights of the first and second lower hook guides 121 and 122 as the central lower hook guides may be set to be equal with reference to the lower surface of the lower rail 100, and to be positioned at a higher level than the engagement heights of the third and fourth lower hook guides 123 and 124 as the outer lower hook guides, which may be set to be equal with reference to the lower surface of the lower rail 100. When the engagement heights of the hook guides are set to be different, it may be possible to provide different engagement heights of the hook guides at different positions and, as such, it may be possible to achieve effective contribution to strength reinforcement even upon collision in various directions and to avoid separation of the seat upon collision.

As described above, the upper hook guides 241, 242, 243, and 244 are formed at the body 210 and the wings 220*a* and 220*b* in the upper rail 200, respectively, and provide a coupling structure achieving hook engagement at at least four places together with the lower hook guides 121, 122, 123, and 124 of the lower rail 100, and, as such, sufficient strength reinforcement may be achieved even in the monopost structure.

Although the illustrated embodiments illustrates hook engagement at four places, this is by way of example only, and the present disclosure is not limited thereto. For example, according to another embodiment, hook engagement at more than four places may be applied.

Meanwhile, in a hook-coupled state of the upper rail 200 and the lower rail 100, the hook guides for hook engagement do not come into contact with each other during normal sliding operation of the upper rail 200. That is, in accordance with the illustrated embodiment, the upper hook guides 241, 242, 243, and 244 are arranged to be spaced apart from the lower hook guides 121, 122, 123, and 124 by a predetermined distance, as shown in FIG. 7. Meanwhile, retainers 260*a* and 260*b* are interposed between the upper rail 200 and the lower rail 100 and, as such, eliminate the space between upper rail 200 and the lower rail 100. The retainers 260*a* and 260*b* may be installed in the longitudinal direction of the upper rail 200. According to an embodiment, the retainers 260*a* and 260*b* function to support uniform load while being in surface contact with the upper rail 200 and the lower rail 100.

In particular, each of the retainers 260*a* and 260*b* is configured to have a hollow structure 262 therein. According to an embodiment, each of the retainers 260*a* and 260*b* is fixedly mounted on the lower rail 100 while being completely in close contact with the upper rail 200 by means of the inner hollow structure 262. For example, as illustrated in FIG. 7, each of the retainers 260*a* and 260*b* may be formed with protrusions 261 extending toward contact surfaces of the lower rail 100 to contact the retainer 260*a* or 260*b*. The retainers 260*a* and 260*b*, which are mounted on the upper rail 200, may come into close contact with the inner surface of the lower rail 100 via the protrusions 261 and, as such, may be press-fitted between the upper rail 200 and the lower rail 100. When press-fitted, the retainers 260*a* and 260*b* are deformed inwards via the hollow structures 262 thereof and, as such, the lower rail 100 and the upper rail 200 may elastically support each other. Meanwhile, the retainers 260*a* and 260*b* may be made of plastic.

Thus, the clearance between the upper rail 200 and the lower rail 100 may be offset by the retainers 260*a* and 260*b* having the above-described structure. As a result, during sliding operation, it may be possible to avoid generation of vibration and noise and to minimize power loss.

As an alternative to the configuration illustrated in FIG. 4, the retainers 260a and 260b may be mounted on the lower rail 100. In this case, each of the retainers 260a and 260b should be mounted on the lower rail 200 throughout the entire length of the lower rail 100.

The vehicle seat track mechanism having the above-described configuration has advantages in that the vehicle seat track mechanism is connected to the seat by the monopost in accordance with application of the monotrack structure and, as such, may obtain improved aesthetics of the seat while appropriately coping with various seat movements applicable to autonomous vehicles. Although the monopost is applied, sufficient strength performance coping with head-on or rear-end collision may be secured and, as such, there is an advantage in that vehicle stability may be maintained.

Meanwhile, a gap should be present between the upper rail and the lower rail in the seat track mechanism in order to avoid need of excessive operating force for sliding operation between the upper rail and the lower rail. Of course, when the gap between the upper rail and the lower rail is excessive, the user may feel lateral shaking of the seat due to a lateral clearance of the seat track mechanism and, as such, ride comfort may be deteriorated.

To this end, according to an exemplary embodiment of the present disclosure a locking mechanism 1000 capable of variably controlling an inter-rail gap is provided in such a manner that a predetermined gap is formed between the upper rail and the lower rail during sliding operation in order to avoid loss of operating force, and the gap between the upper rail and the lower rail is reduced when in a stopped or fixed state of the seat in order to reduce shaking.

In particular, the locking mechanism 1000 of the seat track mechanism according to the exemplary embodiment of the present disclosure is disposed between vertical members, such as the hook guides of the lower rail, while forming a predetermined gap. In the present disclosure, such a gap is referred to as a "rail gap." The rail gap is defined to mean the space between the locking mechanism 1000 and the lower rail. In particular, in the exemplary embodiment of the present disclosure, the rail gap may have the same function as the space between the upper rail and the lower rail in practice because the locking mechanism 1000 is fixedly mounted on the upper rail.

The rail gap may be variably controlled in accordance with operation of inner constituent elements of the locking mechanism 1000. In particular, the locking mechanism 1000 is configured to have different gap sizes in a state in which sliding operation of the upper rail is carried out and a state in which the sliding operation of the upper rail has been completely ended.

In detail, when the seat track mechanism carries out sliding operation, that is, when the upper rail, on which the seat is mounted, slides on the lower rail, the locking mechanism 1000 mounted on the upper rail is maintained in a state in which a predetermined gap is formed between the locking mechanism 1000 and the lower rail. The rail gap in this state may have a maximum gap size.

On the other hand, when motor driving is completed, sliding of the seat is gradually stopped, and seat sliding is then completely ended. In this case, the locking mechanism 1000 of the seat track mechanism according to the illustrated embodiment operates to substantially eliminate the gap between the locking mechanism 1000 and the lower rail.

As shown in FIG. 8 the locking mechanism 1000 according to the illustrated embodiment of the present disclosure includes a center case 1200 fixedly mounted on the upper rail, and a center plate 1100 disposed within the center case 1200 in such a manner that the center plate 1100 moves alone or together with the center case 1200.

In particular, in the seat track mechanism including the locking mechanism 1000 according to the illustrated embodiment, the driver thereof is not directly mounted to the upper rail, but is mounted to the center plate 1100 of the locking mechanism 1000. In the illustrated embodiment of the present disclosure, the driver is illustrated as including the motor, the lead screw, and the nut member. Here, mounting of the driver on the center plate 1100 means that the motor or the nut member, on which the motor is mounted, is mounted on the center plate 1100.

Meanwhile the center case 1200, in which the center plate 1100 is received, is mounted on the upper rail, for example, on the lower portion of the upper rail.

In addition, in accordance with the illustrated embodiment, the center case 1200 and the upper rail are movable together in link with the center plate 1100, on which the motor or the nut member is mounted, in order to slide the seat by driving force of the motor. To this end, the center plate 1100 and the center case 1200 are configured to secure sufficient surface contact therebetween in order to enable transmission of driving force of the center plate 1100 to the center case 1200 and the upper rail.

Hereinafter, the locking mechanism 1000 of the seat track mechanism according to the illustrated embodiment will be described with reference to the annexed drawings.

FIG. 8 illustrates the center plate 1100 and the center case 1200 in the locking mechanism 1000 according to an embodiment of the present disclosure. FIG. 9 illustrates the fastening of the center plate 1100 to the nut member. FIGS. 10A and 10B and FIGS. 11A and 11B illustrate operation states of the locking mechanism 1000 according to the illustrated embodiment, respectively.

As illustrated in FIGS. 10A and 10B and FIGS. 11A and 11B, the locking mechanism 1000 according to the illustrated embodiment is disposed between the inner hook guides 121 and 122 of the lower rail, to variably control a gap between the lower rail and the locking mechanism 1000.

In particular, the center plate 1100, which is disposed within the center case 1200, is mounted to the nut member, to be integrated with the nut member, and is movable forward or rearward within the center case 1200 in accordance with motor driving. In particular, the center plate 1100 is configured to move together with the center case 1200 while transmitting driving force of the motor to the center case 1200, and to carry out relative movement within the center case 1200 in a specific situation.

A detailed structure of the center plate 1100 associated with the above-described configuration is illustrated in FIG. 8. As illustrated in FIG. 8, the center plate 1100 according to the illustrated embodiment includes a pair of pressing heads 1101 and 1102 and a rod 1103 connecting the pressing heads 1101 and 1102. In addition, mounting holes 1150 may be formed through the pressing heads 1101 and 1102, to mount the motor-mounted nut member 330 to the pressing heads 1101 and 1102. The nut member may be fastened to the pressing heads 1101 and 1102 by fastening members such as bolts fastened through the mounting holes 1150.

Of course, the mounting position of the nut member is not limited to the pressing heads 1101 and 1102. There is no limitation as to the mounting position of the nut member so long as the center plate 1100 can move together with the nut member in accordance with driving of the motor. For example, the nut member may be mounted on the rod 1103 of the center plate 1100.

Meanwhile, although the illustrated embodiment includes a pair of pressing heads 1101 and 1102, according to other embodiments a single pressing head may be applied. The center plate 1100, which includes a single pressing head, also operates in accordance with the same principle as that of the locking mechanism (including a pair of pressing heads) to be described later. Of course, the configuration including a pair of pressing heads, namely, the pressing heads 1101 and 1102, is more effective in providing structural rigidity upon seat stopping.

Each of the pressing heads 1101 and 1102 of the center plate 1100 has a pair of actuating surfaces to press fingers 1220 of the center case 1200. A pressing protrusion 1110 and receiving grooves 1130a and 1130b are formed at each actuating surface in each of the pressing heads 1101 and 1102. The pressing protrusion 1110 and the receiving grooves 1130a and 1130b may be formed at an outer side surface extending substantially in parallel with the movement direction of the upper rail as an outer actuating surface of the associated pressing head 1101 or 1102.

In particular, the receiving grooves 1130a and 1130b are formed at opposite sides of the pressing protrusion 1110, respectively, and, as such, the actuating surface of the associated pressing head 1101 and 1102 may form a W-shaped actuating surface. In addition, stopper protrusions 1120a and 1120b are formed at ends of each of the pressing heads 1101 and 1102. The stopper protrusions 1120a and 1120b restrain the associated pressing head 1101 and 1102 to prevent the associated pressing head 1101 and 1102 from being separated from the associated fingers 1220. For example, when the pressing heads 1101 and 1102 move forward or rearward excessively, the pressing heads 1101 and 1120 may be completely separated from the fingers 1220. To this end, the stopper protrusions 1120a and 1120b are formed to further protrude outwards, as compared to the pressing protrusions 1110 and, as such, it may be possible to effectively avoid separation of the pressing heads 1101 and 1102 by the stopper protrusions 1120a and 1120b.

In addition, one or more cavities 1140 may be formed in each of the pressing heads 1101 and 1102. The cavities 1140 may provide elasticity to the associated pressing head 1101 and 1102 during pressing operation of the associated pressing head 1101 or 1102.

Meanwhile, one pressing head, for example, the pressing head 1101, may be connected to the rod 1103, and the rod 1103 may be connected to the other pressing head, for example, the pressing head 1102. In this case, the center plate 1100 has a longitudinally symmetrical structure. The front pressing head 1101 may be referred to as a "first pressing head 1101," and the rear pressing head 1102 may be referred to as a "second pressing head 1102."

In addition, as illustrated in FIG. 9, the motor-mounted nut member in the seat track mechanism according to the illustrated embodiment is mounted to the first pressing head 1101 and, as such, driving force of the motor is transmitted to the second pressing head 1102 via the rod 1103.

A detailed configuration of the center case 1200 operating together with the center plate 1100 including the pressing heads 1101 and 1102 is illustrated in FIG. 8. The center case 1200 is mounted to the upper rail. According to an embodiment, the center case 1200 is disposed beneath a central portion of the upper rail. The center case 1200 is a case for receiving the center plate 1100. In regard with this, the center case 1200 may include a lower case 1210 disposed over the center plate 1100, and an upper case 1260 (as depicted in FIG. 10B) disposed beneath the center plate 1100. Of course, the upper case 1260 may be omitted, and the lower case 1210 may be mounted directly on the lower surface of the upper rail.

The lower case 1210 is mounted to the upper rail by means of a plurality of fastening members such as bolts. As illustrated in FIG. 8, front and rear ones of the fastening members may function as hinge points 1222 for the fingers 1220, as opposed to the central the fastening members.

In addition, slots 1250 may be formed through the lower case 1210 for fastening members fastened through the mounting holes 1150 of the pressing heads 1101 and 1102. Accordingly, even when the fastening members protrude outwards of the pressing heads 1101 and 1102, the protruded fastening members may move within the slots 1250. Thus, the slots 1250 provide spaces allowing the fastening members fastened to the pressing heads 1101 and 1102 to move during forward or rearward movement of the center plate 1100.

Additional slots 1250 may also be formed through the upper case 1260 at the same positions as the slots 1250 of the lower case 1210, respectively. Fastening members extend through the slots 1250 of the upper case 1260 and connect the nut member and the center plate 1100. Although not shown, slots 1250 having the same shape as the above-described slots 1250 may be formed at the lower surface of the lower rail.

As illustrated in FIG. 8, the center case 1200 according to the illustrated embodiment is configured to have a symmetrical structure and to include at least two fingers 1220 operating together with the pressing heads 1101 and 1102 of the center plate 1100.

For example, the center plate 1100, which includes a single pressing head, may include two fingers 1220. When the center plate 1100 includes a pair of pressing heads, the center plate 1100 may include four fingers 1220.

The fingers 1220 associated with each of the pressing heads 1101 and 1102 are hinged at opposite sides of the associated pressing head 1101 or 1102, respectively, in such a manner that the fingers 1220 can contact the actuating surfaces of the pressing head 1101 or 1102. As illustrated in FIG. 8, as the fingers 1220 are hinged at the hinge points 1222 of the center case 1200, the fingers 1220 are rotatable in a direction pressing the lower rail or in a direction releasing pressing of the lower rail. In addition, each finger 1220 is formed with a finger protrusion 1221 protruding toward an associated one of the pressing heads 1101 and 1102.

The finger protrusion 1221 is arranged to contact the actuating surface of the associated pressing head 1101 and 1102 formed with the pressing protrusion 1110 and the receiving grooves 1130a and 1130b. That is, the finger protrusion 1221 of each finger 1220 may be in contact with the pressing protrusion of the associated pressing head 1101 and 1102 or may be maintained in a state of being seated in one of the receiving grooves 1130a and 1130b of the associated pressing head 1101 or 1102. These states are switched in accordance with sliding operation of the seat.

Meanwhile, the surface of each finger 1220 opposite to the finger protrusion 1221 of the finger 1220 functions as a surface pressing the finger 1220. As illustrated in FIGS. 10A and 11A, when the finger protrusions 1221 come into contact with the associated pressing protrusions 1110, the associated fingers 1220 press the opposite hook guides of the lower rail by the pressing surfaces thereof, respectively, while being widened outwards by the pressing protrusions 1110. On the other hand, when the finger protrusions 1221 are seated in the receiving grooves 1130a or 1130b, respectively, the associated fingers 1220 release pressing force applied to the lower rail while being narrowed inwards.

Elastic members 1230 may be installed around respective fingers 1220, to provide restoring force for narrowing the fingers 1220 inwards. According to an embodiment, each elastic member 1230 may be a C-shaped plate spring adapted to exert inward force. The plate spring is adapted to press the outer surface of the associated finger 1220.

In addition, pressing pads 1240 may be disposed outside respective fingers 1220. The pressing pads 1240 are interposed between respective fingers 1220 and the lower rail and, as such, the fingers 1220 press respective pressing pads 1240 while being widened. In this case, when the gap between each pressing pad 1240 and the lower rail is reduced, and is sufficiently pressed by the associated finger 1220, the side of the gap becomes zero and, as such, a press fit state between the locking mechanism 1000 and the lower rail may be obtained. According to an embodiment, the number of the pressing pads 1240 is equal to the number of the fingers 1220. In addition, the pressing pads 1240 may be arranged to correspond to the finger protrusions 1221 of the fingers 1220, respectively.

Each pressing pad 1240 may be made of metal or plastic, and may be mounted on the lower case 1210 or may be mounted to the pressing surface of the associated finger 1220.

Thus, when the finger protrusions 1221 of the fingers 1220 come into close contact with the pressing protrusions 1110 of the associated pressing head 1101 or 1102, respectively, the fingers 1220 press the associated pressing pads 1240 disposed at opposite sides of the fingers 1220 while being widened outwards. As a result, the gap between each pressing pad 1240 and the lower rail disappears.

In this case, the widening angle between the fingers 1220 widened by the associated pressing head 1101 or 1102, that is, the rotation angle of the fingers 1220 in opposite outward directions of the locking mechanism 1000, for example set to be smaller than a maximum rotation angle obtained through widening carried out by the pressing head 1101 or 1102. In connection with this, the maximum rotation angle between the fingers 1220 is obtained at a position where the tip of each pressing protrusion 1110 contacts the tip of the associated finger protrusion 1221.

Accordingly, a sufficient press fit state may be obtained between the lower rail and the locking mechanism 1000, only when a situation in which the rail gap becomes zero is established before the tip of each pressing protrusion 1110 meets the tip of the associated finger protrusion 1221.

Meanwhile, the reason why two receiving grooves 1130*a* and 1130*b* are formed at each actuating surface in each of the pressing heads 1101 and 1102 is that the finger protrusion 1221 of the associated finger 1220 should be positioned at a different one of the receiving grooves 1130*a* and 1130*b* in accordance with a different one of forward movement and rearward movement of the seat.

That is, assuming that the left downward direction in FIG. 10A is the forward movement direction of the seat, each finger protrusion 1221 is positioned at the rear receiving groove 1130*b* of the associated pressing head 1101 and 1102 when the seat moves forward, as illustrated in FIG. 10B, because the center plate 1100 moves forward. On the other hand, when the seat moves rearward, each finger protrusion 1221 is positioned at the front receiving groove 1130*a* of the associated pressing head 1101 and 1102 because the center plate 1100 moves rearward.

In this case, the driving force of the motor should be sufficiently great for movement of the center plate 1100 between the front and rear receiving grooves 1130*a* and 1130*b*. Furthermore, the cavities 1140 formed at the pressing heads 1101 and 1102 function to temporarily deform the actuating surfaces of the pressing heads 1101 and 1102.

Hereinafter, detailed operation of the locking mechanism 1000 according to the illustrated embodiment will be described with reference to FIGS. 10A, 10B, 11A and 11B.

FIG. 10A illustrates a state in which each pressing protrusion 1110 of the pressing heads 1101 and 1102 is in contact with the finger protrusion 1221 of the associated finger 1220, that is, a state in which the seat is stopped at a certain position. FIG. 10B illustrates the entirety of the locking mechanism 1000 including the upper case 1260 in the state of FIG. 10A.

In the state of FIG. 10A, the pressing protrusion 1110 pushes the finger 1220 outwards while contacting the finger protrusion 1221 of the finger 1220. When the pressing protrusion 1110 sufficiently pushes the finger 1220, a press fit state between the center case 1200 and the lower case is obtained because outward force from the pressing protrusion 1110 is applied to the finger 1220. In this state, the rail gap between the pressing pad 1240 of the finger 1220 and the lower rail becomes zero. Accordingly, the gap between the upper rail and the lower rail substantially disappears and, as such, lateral movement of the seat is avoided.

On the other hand, FIG. 11A illustrates a state in which contact between the pressing protrusion 1110 and the finger protrusion 1221 is released and, as such, the finger protrusion 1221 is positioned at one of the associated receiving grooves. FIG. 11B illustrates the entirety of the locking mechanism 1000 including the upper case 1260 in the same state as above.

The receiving grooves 1130*a* and 1130*b* provide spaces for receiving the finger protrusion 1221. As illustrated in FIG. 10A, the receiving grooves 1130*a* and 1130*b* provide spaces allowing the finger protrusion 1221 to again rotate inwards in accordance with forward or rearward movement of the associated pressing head 1101 and 1102 in a state in which the pressing protrusion and the finger protrusion 1221 are completely in close contact with each other.

In detail, the center plate 1100 first moves when the motor drives. As a result, contact between the pressing protrusion 1110 and the finger protrusion 1221 is released. As the finger protrusion 1221 subsequently moves to one of the receiving grooves 1130*a* and 1130*b*, as illustrated in FIG. 11A, the finger 1220 rotates inwards and, as such, the press fit state between the lower rail and the locking mechanism 1000 is released.

Of course, the center plate 1100 and the center case 1200 contact each other via the receiving grooves of the pressing heads 1101 and 1102 and the finger protrusions 1221, and the driving force of the motor is transmitted to the center case 1200 in accordance with such contact. Accordingly, during driving of the motor, the center case 1200 and the center plate 1100 move forward and rearward together.

Furthermore, when each finger protrusion 1221 is positioned at the associated receiving groove, a rail gap g is sufficiently maintained between the lower rail and the locking mechanism 1000 and, as such, it may be possible to secure sufficient actuating force for sliding operation of the seat.

Meanwhile, when driving of the motor is completed, movement of the seat is also stopped. In this case, each finger protrusion 1221 returns to a stop state in which the finger protrusion 1221 contacts the associated pressing protrusion 1110 (FIG. 10A), by virtue of inertia of the seat generated when movement of the seat is stopped.

In accordance with embodiments of the present disclosure, a seat track mechanism including a monotrack mechanism having a single rail structure is provided. Accordingly, the structure of the seat bottom may be simplified and, as such, it may be possible to achieve a reduction in manufacturing costs and an elegant and slim design of the seat bottom.

In addition, in accordance with embodiments of the present disclosure, it may be possible to provide a monotrack mechanism having a single rail structure, which is capable of not only minimizing vertical/lateral clearance between upper and lower rails included in the monotrack mechanism, but also reducing actuating force required for movement of a seat, to enable the seat to move smoothly, and preventing creation of excessive clearance in a stopped state of the seat, in spite of application of the single rail structure.

The present disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A seat track mechanism for a vehicle comprising: a lower rail fixed to a body of the vehicle; an upper rail mounted to a seat of the vehicle, and movable forward and rearward along the lower rail; a driver for providing an actuating force to move the upper rail forward and rearward along the lower rail; and a locking mechanism mounted to the upper rail and adapted to control a rail gap between the locking mechanism and the lower rail, to restrain movement of the upper rail, wherein the locking mechanism reduces the rail gap when the vehicle seat is in a stopped state, to restrain the movement of the upper rail, and increases the rail gap when the vehicle seat is moved by the driver, to release movement restraint of the upper rail, wherein the locking mechanism comprises: a center case fixed mounted on the upper rail; and a center plate received in the center case in such a manner that the center plate moves alone or together with the center case, wherein the center plate is mounted to the driver, wherein: the center plate comprises a pressing head having two actuating surfaces each formed with a pressing protrusion and receiving grooves; and the center case comprises a pair of fingers for pressing the lower rail while operating together with the pressing head.

2. The seat track mechanism according to claim 1, wherein the driver comprises: a lead screw rotatably mounted to the lower rail; a motor for rotating the lead screw; and a nut member mounted to the upper rail and formed with female threads having a shape corresponding to a screw shape of the lead screw, the nut member moving forward and rearward in accordance with rotation of the lead screw.

3. The seat track mechanism according to claim 1, wherein each of the actuating surfaces in the pressing head comprises a W-shaped actuating surface formed with the pair of receiving grooves at opposite sides of the pressing protrusion and formed with stopper protrusions at opposite ends thereof.

4. The seat track mechanism according to claim 1, wherein at least one cavity is formed within the pressing head.

5. The seat track mechanism according to claim 1, wherein: the center case comprises a lower case supporting the center plate, and an upper case connected to the lower case and mounted to a lower portion of the upper rail; and the fingers are hinged to the lower case.

6. The seat track mechanism according to claim 1, wherein: the fingers are formed with finger protrusions protruding toward the pressing head, respectively; and the actuating force of the driver is transmitted to the center case via the finger protrusions contacting the pressing head.

7. The seat track mechanism according to claim 6, wherein the fingers press the lower rail while being widened as the pressing head moves while contacting the finger protrusions during driving of the driver.

8. The seat track mechanism according to claim 6, wherein each of the fingers has a pressing surface formed at an opposite side of the finger protrusion of the finger, and a pressing pad is disposed between the pressing surface of the finger and the lower rail.

9. The seat track mechanism according to claim 8, wherein the pressing pad is installed on the center case in such a manner that a predetermined gap is maintained between the pressing pad and the lower rail when the pressing pad is not pressed by the finger, and the gap between the pressing pad and the lower rail is eliminated when the pressing pad is pressed by the finger.

10. The seat track mechanism according to claim 1, wherein a pair of elastic members is installed at the center case, to provide a restoring force for narrowing the fingers inwards.

11. The seat track mechanism according to claim 10, wherein the elastic members are plate springs for applying an inward force to the fingers, respectively.

12. The seat track mechanism according to claim 1, wherein: the lower rail comprises a pair of hook guides provided at a central lower portion of the lower rail; and the locking mechanism is disposed between the hook guides, and controls the rail gap as the fingers press the hook guides disposed adjacent thereto, respectively.

13. The seat track mechanism according to claim 1, wherein: the center plate has a symmetrical structure comprising the pressing head, a rod connected to the pressing head, and another pressing head connected to the rod; and the center case further comprises another pair of fingers connecting the other pressing head.

14. A seat track mechanism for a vehicle comprising: a lower rail fixed to a body of the vehicle; an upper rail mounted to a seat of the vehicle, and configured to move forward and rearward along the lower rail; a driver for providing an actuating force to move the upper rail forward and rearward along the lower rail, wherein the driver comprises: a lead screw rotatably mounted to the lower rail; a motor for rotating the lead screw; and a nut member mounted to the upper rail and formed with female threads having a shape corresponding to a screw shape of the lead screw, the nut member moving forward and rearward in accordance with rotation of the lead screw; and a locking mechanism mounted to the upper rail that selectively controls a rail gap between the locking mechanism and the lower rail so as to selectively restrain and facilitate movement of the upper rail, wherein the locking mechanism comprises: a center case fixedly mounted on the upper rail; and a center plate that is mounted to the driver and received in the center case in such a manner that the center plate moves alone or together with the center case, wherein the locking mechanism reduces the rail gap when the vehicle seat is in a stopped state, to restrain the movement of the upper rail, and increases the rail gap when the vehicle seat is moved by the driver, to release movement restraint of the upper rail, wherein: the center plate comprises a pressing head having two actuating surfaces each formed with a pressing protrusion and receiving grooves; and the center case comprises a pair of fingers for pressing the lower rail while operating together with the pressing head.

15. The seat track mechanism according to claim 14, wherein each of the actuating surfaces in the pressing head comprises a W-shaped actuating surface formed with the pair of receiving grooves at opposite sides of the pressing protrusion and formed with stopper protrusions at opposite ends thereof.

16. The seat track mechanism according to claim 14, wherein at least one cavity is formed within the pressing head.

\* \* \* \* \*